United States Patent
Hahn et al.

(10) Patent No.: US 7,937,707 B1
(45) Date of Patent: May 3, 2011

(54) METHOD FOR GENERAL RESOURCE EXIT NEGOTIATION

(75) Inventors: Stephen C. Hahn, Redwood City, CA (US); David E. Powell, Sunnyvale, CA (US); Michael W. Shapiro, San Francisco, CA (US)

(73) Assignee: Oracle America, Inc., Redwood City, CA (US)

( * ) Notice: Subject to any disclaimer, the term of this patent is extended or adjusted under 35 U.S.C. 154(b) by 1877 days.

(21) Appl. No.: 10/881,919

(22) Filed: Jun. 30, 2004

(51) Int. Cl.
*G06F 9/46* (2006.01)
*G06Q 20/00* (2006.01)

(52) U.S. Cl. .......................................... 718/104; 705/80
(58) Field of Classification Search .................... 718/104
See application file for complete search history.

(56) References Cited

U.S. PATENT DOCUMENTS

| | | | | |
|---|---|---|---|---|
| 6,463,454 | B1 * | 10/2002 | Lumelsky et al. | 718/105 |
| 6,529,950 | B1 * | 3/2003 | Lumelsky et al. | 709/218 |
| 7,103,580 | B1 * | 9/2006 | Batachia et al. | 705/80 |
| 2002/0007389 | A1 * | 1/2002 | Jones et al. | 709/104 |
| 2003/0041107 | A1 * | 2/2003 | Blattner et al. | 709/204 |

OTHER PUBLICATIONS

Conversation-oriented Protocols for Contract Negotiations Hanson et al, Enterprise Distributed Object Computing Conference, 2003.*

* cited by examiner

*Primary Examiner* — Meng-Ai An
*Assistant Examiner* — Mengyao Zhe
(74) *Attorney, Agent, or Firm* — Osha • Liang LLP

(57) ABSTRACT

A method for changing a binding relationship with a system resource involves creating a binding relationship between a process and a system resource, establishing a contract between the process and the system resource wherein a negotiation event is defined, obtaining the negotiation event in the process, and negotiating an exit from the binding relationship within a predetermined negotiation period when the negotiation event is obtained.

33 Claims, 5 Drawing Sheets

METHOD FOR GENERAL RESOURCE EXIT NEGOTIATION

BACKGROUND

During execution, all software applications have dependency relationships (i.e., binding relationships) with system resources provided to the applications by the operating system. When software applications have extremely long run times, these dependency relationships may need to change for reasons such as: (1) failure of a system resource; or (2) administrative removal of a system resource for preventative maintenance or dynamic reallocation.

In many cases, software applications may be critically dependent on the continued availability of certain system resources in order to provide a certain level of performance. For example, a database program may rely on the availability of a large block of locked memory, a multiprocessing application may be configured to execute on a known number of CPUs, or a secure web site may depend on a facility providing cryptography services for accelerated encryption and decryption to perform at peak efficiency.

Generally, a combination of approaches is used in computing environments to handle changes in dependency relationships (e.g., failure of or administrative removal of a system resource). The approach employed depends on such factors as the type of the system resource, the capabilities of the affected software applications, and the capabilities of the operating system.

One approach is to terminate and restart software applications depending on a system resource if the system resource is removed or reallocated, wholly or in part. Another approach is to execute software applications in a virtual machine environment where the applications use virtual system resources that are seemingly always available. Under this approach, reconfigurations or reallocations that may take place with the underlying physical system resources are not apparent to the executing applications. A third approach provides a centralized system event handler that notifies registered software applications of events affecting system resources after the events have occurred. A fourth approach is found in some computer systems that support dynamic reconfiguration (i.e., removal and addition of system components while the system is running). This approach involves the use of a scripting mechanism to permit software applications using a dynamically reconfigurable system component to take some limited actions before a reconfiguration operation is executed. An application may be registered for notification of a reconfiguration operation on a dynamically reconfigurable system component by registering a script in a reconfiguration framework. The reconfiguration framework launches the script in response to a reconfiguration request, if the request impacts components that are registered by the script. The application is afforded an opportunity to release the component, to perform an orderly shut down, or to refuse to allow the reconfiguration operation to proceed.

SUMMARY

In general, in one aspect, a method for changing a binding relationship with a system resource involves creating a binding relationship between a process and a system resource, establishing a contract between the process and the system resource wherein a negotiation event is defined, obtaining the negotiation event in the process, and negotiating an exit from the binding relationship within a predetermined negotiation period when the negotiation event is obtained.

In general, in one aspect, a method for changing a plurality of binding relationships with a system resource involves creating a binding relationship between each process of a plurality of processes and a system resource, and establishing a plurality of contracts with the system resource, where each process of the plurality of processes owns one contract of the plurality of contracts, and where negotiation events are defined in each contract of the plurality of contracts. The method also involves obtaining the negotiation events in the plurality of processes concurrently, and negotiating exits from the plurality of binding relationships within predetermined negotiation periods when the negotiation event is obtained.

In general, in one aspect, a mechanism for changing a binding relationship with a system resource includes a process, a system resource where the process has a binding relationship with the system resource, a contract between the process and the system resource; and a contract subsystem providing management of the contract. The contract subsystem receives an event affecting the system resource, determines whether the event violates a term of the contract, and provides the process a predetermined negotiation period if the event violates the term where the process negotiates an exit from the binding relationship.

In general, in one aspect, a computer system enabled to change a binding relationship with a system resource, includes a processor, a memory operatively connected to the processor, a system resource, and software instructions stored in the memory for enabling the computer system to create a binding relationship between a process and a system resource, establish a contract between the process and the system resource wherein a negotiation event is defined, obtain the negotiation event in the process, and negotiate an exit from the binding relationship within a predetermined negotiation period when the negotiation event is obtained.

Other aspects of the invention will be apparent from the following description and the appended claims.

DETAILED DESCRIPTION

Figure 1:
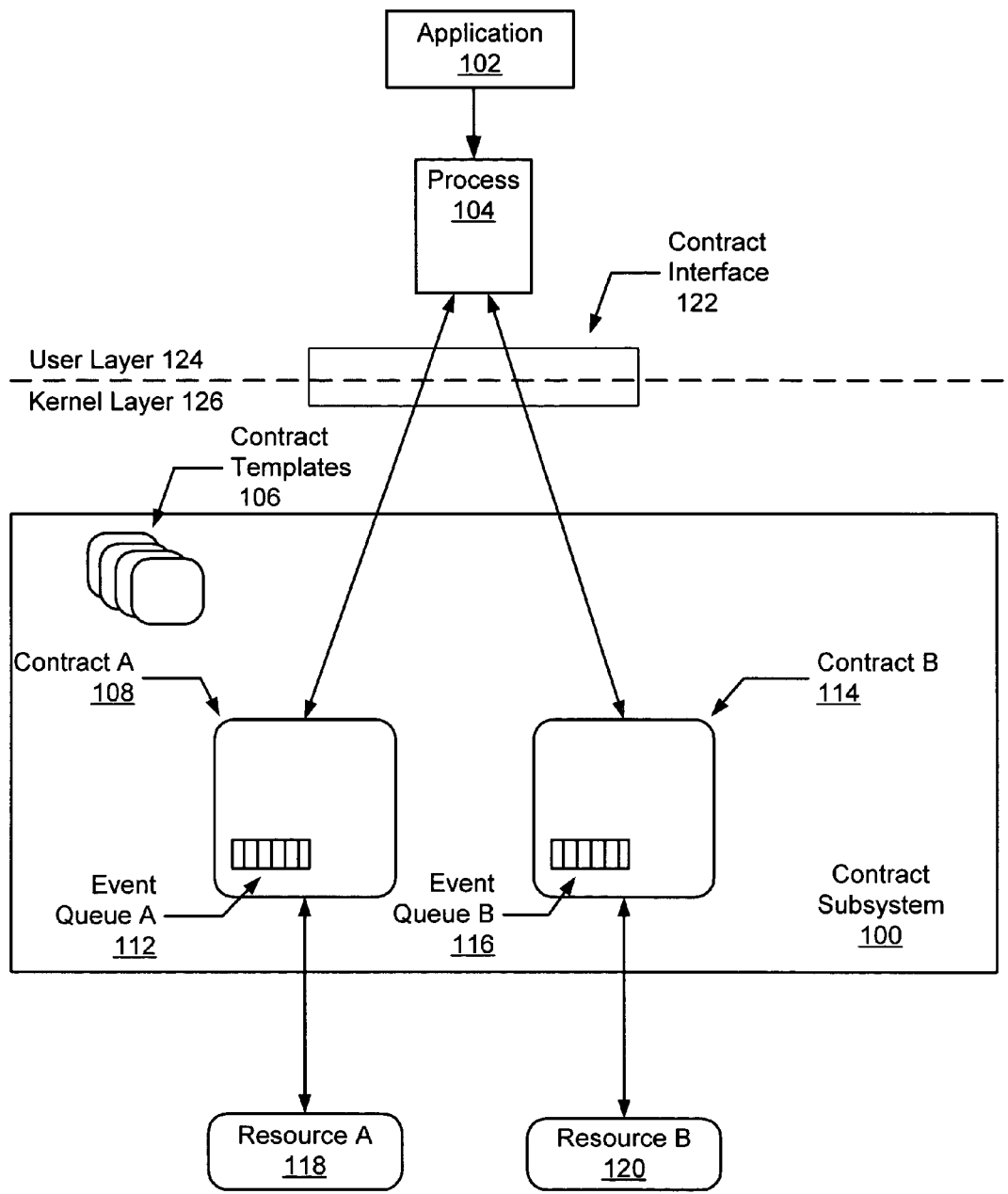
FIG. 1 shows a flow diagram in accordance with one embodiment of the invention.

Exemplary embodiments of the invention will be described with reference to the accompanying drawings. Like items in the drawings are shown with the same reference numbers.

In an embodiment of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

One or more embodiments of the invention relate to a method and apparatus allowing software applications that are critically dependent on a system resource to adapt to administrative changes in the availability of the system resource before the administrative change is made. More specifically, a method and apparatus are provided for negotiating an exit from a binding relationship between a system resource and a process. A contract with terms defining the availability assumptions of a binding relationship is created between a system resource and a process using that system resource. If the system resource availability is changed in some manner that violates the terms of the contract, the process is notified of the change. In one embodiment, depending on the terms of the contract and the type of the system resource, the contract does as little as inform the process asynchronously that the system resource has failed or is no longer available. A more complex contract provides for synchronous behavior, allowing the process time to react to a change in the availability of the system resource before the change occurs and to create, if appropriate, a replacement contract to cover the new state of the system after the change in the system resource occurs.

FIG. 1 shows a mechanism providing for negotiation of exit from a binding relationship between a process and a system resource (i.e., allowing a process to respond to a change in the availability of a system resource) in accordance with one embodiment of the invention. During execution, an application (102) uses certain system resources (e.g., System Resource A (118), System Resource B (120)). These system resources may be actual devices or other computer hardware managed by the operating system or may be a service provided by the operating system.

Examples of system resources include: countable resources (e.g., individual processors, or a set of locked physical memory pages used by a database program); fungible countable resources (e.g., the processors in a processor set); rate-based resources (e.g., bandwidth through an input/output (I/O) channel, through a network interface, or from an encryption/decryption service); continuous amount resources (e.g., memory required in bytes but the operating system may manage in different units); or relationship resources (e.g., resources that may satisfy a mathematical constraint determined by an external agent).

When a change in the availability of the system resources occurs, the application (102) is able to modify its use of these system resources. In general, the application (102) is a computer program designed for use by end users of computer systems (e.g., a spreadsheet, a work processor, an ftp program, a database, an electronic mail program, a web site, etc.). The application (102) is typically executed in the user layer (124) of an operating system. When an application (102) is executed, at least one process (e.g., process (104)) is created. In general, the process (104) is an operating system construct created to execute the application (102) on a computer system. To use system resources (e.g., System Resource A (118), System Resource B (120)), the process (104) enters into binding relationships with the system resources ((e.g., System Resource A (118), System Resource B (120)). The process (104) interacts with a contract subsystem (100) in the kernel layer (126) of the operating system through a contract interface (122) between the user layer (124) and the kernel layer (126) to create contracts (e.g., Contract A (108), Contract B (114)) around the binding relationships. These contracts enable an exit negotiation (i.e., modification of how an application uses the system resources) when an administrative change is made in the availability of the system resources.

A contract subsystem (100) and a contract interface (122) provide a framework for creating, managing, and terminating contracts (e.g., Contract A (108), Contract B (114)) between processes and system resources. In one embodiment, the contract subsystem (100) includes a set of contract templates (106) that are used when creating contracts. In one embodiment, the set of contract templates (106) includes one contract template for each type of system resource (e.g., System Resource A (118), System Resource B (120)) with which a process (104) may form a contractual relationship.

Still referring to FIG. 1, each of the contract templates (106) includes terms and events that may be used by a process (104) to define a contractual relationship with the type of system resource (e.g., System Resource A (118), System Resource B (120)) associated with one of the contract templates (106). In one embodiment, the terms and events included in the contract templates (106) vary according to the type of the system resource associated with one of the contract templates (106). The events typically represent system actions and errors that affect or potentially affect the binding relationship between the process (104) and the type of system resource (e.g., System Resource A (118), System Resource B (120)) associated with one of the contract templates (106). The terms express the operating assumptions of the process (104) as it executes using the system resource (e.g., System Resource A (118), System Resource B (120)). Terms are typically parameters of the contract templates (106) and may be set by the process (104).

In one embodiment, events are categorized in the contract templates (106) as either informational or critical. Typically, a process (104) may promote an event from informational to critical when defining a contractual relationship. However, depending on the type of the system resource, the ability to make an event critical may be governed by the privilege level of the process (104).

In one embodiment, the contract interface (122) includes functionality allowing a process (104) to direct the contract subsystem (100) to create a contract (e.g., Contract A (108), Contract B (114)) using a contract template included in the contract templates (106); to activate a contract template for automatic creation of a contract, when a binding relationship is created; to define the terms of a contract; to retrieve and acknowledge events; to terminate a contract; and to negotiate an exit from a contract if a term is violated.

Still referring to FIG. 1, in one embodiment, system resources (e.g., System Resource A (118), System Resource B (120)) with which a contract (e.g., Contract A (108), Contract B (114)) may be established include functionality to receive information from the operating system regarding system actions affecting these system resources (e.g., System Resource A (118), System Resource B (120)) and to translate this information into contract events as appropriate. Such system resources (e.g., System Resource A (118), System Resource B (120)) also include functionality to interact with the contract subsystem (100) to mark the contract events as informational or critical as specified in the terms of the active contracts (e.g., Contract A (108), Contract B (114)) associated with the system resources (e.g., System Resource A (118), System Resource B (120)). In addition, such system resources (e.g., System Resource A (118), System Resource B (120)) include functionality to interact with the contract subsystem (100) to place the contract events in the event queues (Event Queue A (112), Event Queue B (116)) of the contracts (e.g., Contract A (108), Contract B (114)).

Processes (104) owning the contracts (e.g., Contract A (108), Contract B (114)) retrieve the contract events from the event queues (e.g., Event Queue A (112), Event Queue B (116)) in order to handle the events. In one embodiment, critical events remain in the event queues (Event Queue A (112), Event Queue B (116)) until all processes (e.g., process (104)) owning the contracts (e.g., Contract A (108), Contract B (114)) explicitly acknowledge retrieving the critical events. The contract subsystem (100) may remove informational events from the event queues (Event Queue A (112), Event Queue B (116)) in first-in, first-out order if one or more processes (e.g., process (104)) do not acknowledge informational events as quickly as these events are being produced.

Still referring to FIG. 1, in one embodiment, a contract event may also be categorized as a negotiation event. The contract subsystem (100) includes functionality to check the contract events for events that violate terms of contracts (e.g., Contract A (108), Contract B (114)). In one embodiment, when such an event is found, the contract subsystem (100) marks that event as a negotiation event before placing the event in the event queue (e.g., Event Queue A (112), Event Queue B (116)) of the affected contract (e.g., Contract A (108), Contract B (114)). Placing the negotiation event in the event queue (e.g., Event Queue A (112), Event Queue B (116)) signifies that an exit negotiation is required between the process (104) owning the contract (e.g., Contract A (108), Contract B (114)) and the system resource affected by the event. The process (104) then is given a predetermined amount of time, i.e., a negotiation period, in which to respond. Typically, this response is to adjust the process's usage of the affected system resource (e.g., System Resource A (118), System Resource B (120)) as required based on the type of the event. The system action represented by the event is blocked until the process (104) completes making the necessary adjustments and acknowledges the event or until the negotiation period ends, whichever occurs first.

In one embodiment, a contract's (e.g., Contract A (108), Contract B (114)) negotiation period may be quite large to accommodate complex responses to a change in a system resource. For example, a database may need a considerable amount of time to respond to the unlocking of a large amount of memory. To reduce the chance that a misbehaving application could inadvertently delay a system action for a lengthy negotiation period, a smaller quantum timeout is also enforced during the negotiation period. In one embodiment, the length of the quantum timeout is predetermined based on the type of the system resource involved. The process (104) notifies the contract subsystem (100) within the quantum timeout period that the process (104) is working on a response. If this quantum timeout expires without such an indication, the negotiation period automatically ends. In one embodiment, at any time before the quantum timeout expires, the process (104) may explicitly request another quantum's worth of time.

As shown in FIG. 1, in one embodiment, contracts (e.g., Contract A (108), Contract B (114)) are established by selecting the contract templates associated with system resources (e.g., System Resource A (118), System Resource B (120)), defining the terms of the desired contract in each of the contract templates, and creating the contracts (e.g., Contract A (108), Contract B (114)) using the initialized contract template.

In one embodiment, contracts (e.g., Contract A (108), Contract B (114)) may be automatically created when processes create binding relationships with system resources (e.g., System Resource A (118), System Resource B (120)). In one embodiment, a contract template is activated by selecting the contract template associated with the type of system resource (e.g., System Resource A (118), System Resource B (120)) with which the process (104) will be establishing one or more binding relationships. The terms of the desired contract are defined in the contract template and the template is placed in a state of readiness to be used when the process (104) actually establishes a binding relationship with the system resource (e.g., System Resource A (118), System Resource B (120)) (i.e., the contract template is activated). The contract subsystem (100) includes functionality to automatically create a contract (e.g., Contract A (108), Contract B (114)) using an activated contract template each time the process (104) establishes a binding relationship with a system resource (e.g., System Resource A (118), System Resource B (120)) of the type associated with the activated contract template.

Still referring to FIG. 1, in one embodiment, if a contract (e.g., Contract A (108), Contract B (114)) will be broken (i.e., a negotiation event has occurred), the contract (e.g., Contract A (108), Contract B (114)) will no longer be in effect and will be terminated at the end of the negotiation period. Therefore, if the process (104) receiving a negotiation event has a continued interest in the availability of a system resource (e.g., System Resource A (118), System Resource B (120)), the process (104) can create a new contract when the old one expires. In one embodiment, to create a new contract, the process (104) activates a contract template from the contract templates (106) for a new contract synchronously with responding to the breach of the old contract. One skilled in the art can appreciate that new contract activation can be done at any time within the negotiation period. When the negotiation period ends, the contract subsystem (100) creates a new contract using the activated template.

In one embodiment, the contract subsystem (100) contains functionality allowing a process (104) to abandon a contract (e.g., Contract A (108), Contract B (114)) when the process (104) is no longer interested in tracking the associated system resource (e.g., System Resource A (118), System Resource B (120)) (e.g., the process (104) exits). Depending on the type of the associated system resource (e.g., System Resource A (118), System Resource B (120)) and the terms of the contract (e.g., Contract A (108), Contract B (114)), the contract subsystem (100) places an abandoned contract (e.g., Contract A (108), Contract B (114)) in a dead state or an orphan state. An orphan contract has no owner, and exits solely because of some side effect the contract (e.g., Contract A (108), Contract B (114)) has on the associated system resource (e.g., System Resource A (118), System Resource B (120)). When the possibility of side effects related to an orphaned contract has been removed, the contract subsystem (100) transitions the orphaned contract to the dead state. Once a contract (e.g., Contract A (108), Contract B (114)) is in the dead state, the contract subsystem (100) may terminate the contract (e.g., Contract A (108), Contract B (114)).

In one embodiment, depending on the type of the associated system resource (e.g., System Resource A (118), System Resource B (120)), a process (104) may create a contract (e.g., Contract A (108), Contract B (114)) only when the binding relationship between the process (104) and a system resource (e.g., System Resource A (118), System Resource B (120)) is formed, or only at some later time during execution after the binding relationship is formed, or both creation options may be available.

In one embodiment, the contract interface (122) includes functionality allowing administrative access to the contract subsystem (100). System administrators and other users with sufficient system privileges may use this functionality to inspect the state of contracts (e.g., Contract A (108), Contract B (114)) and to monitor contract events.

In one embodiment, the contract subsystem (100) and the contract interface (122) include functionality to collect contract events into queues other than contract event queues and to access those queues. Such queues may include a bundle queue and a process bundle queue. A bundle queue aggregates contract events from all contracts (e.g., Contract A (108), Contract B (114)) in the contract subsystem (100) that are created using the same contract type. A process bundle queue aggregates contract events from all contracts (e.g., Contract A (108), Contract B (114)) held by a process (104) that are created using the same contract type.

While a single application, a single process, and two system resources are shown in the embodiment of FIG. 1, one skilled in the art will appreciate that the number of applications, the number of processes, and the system resource usage of each may vary depending on the embodiment of the invention. In one embodiment, multiple processes may have contracts with the same system resource. If an event occurs that violates a term of more than one of these contracts (i.e., a negotiation event), all processes having a breached contract are notified concurrently of the breach (i.e., receive a negotiation event in the event queue of the contract on the system resource owned by each process). The system action represented by the event is delayed until all the processes have responded to their respective negotiation events, or until all the negotiation periods expire, whichever comes first.

The operation of the mechanism of FIG. 1, in accordance with one or more embodiments of the invention, is explained below in relation to a specific type of system resource, a processor set. A processor set is an administratively created subset of the processors in a multiprocessor system. This subset of processors is typically dedicated an application and only that application may execute on those processors. However, multiple applications may share a processor set using a particular scheme such as time-sharing.

Assume that an application that uses multiple processors, (e.g., a graphics intensive application) is executed and the process created by the operating system for the application is administratively assigned to execute on a processor set that includes five processors. This application has been designed to reconfigure its execution behavior depending on the number of processors made available to it during execution but it always requires an even number of processors. Currently, the process is configured to use four processors. The process interacts with the contract interface to direct the contract subsystem to create a contract with the processor set so that the process is notified if the number of processors changes.

To create the contract, a contract template for a processor set contract is created from the contract templates and the terms of the contract are defined. In one embodiment, the terms of a processor set contract template include the minimum number of processors acceptable to the process (MinCPUs), the maximum number of processors acceptable to the process (MaxCPUs), and the identity of the processor set with which the process requesting the contract wishes to have a contract (ProcSetId). The events included in a processor set contract template include adding a processor to the processor set (CPUadd), and removing a processor from the processor set (CPUremove).

The process sets the minimum number of processors to be four, the maximum number of processors to be five, and the processor set identifier to be that of the processor set. The contract subsystem then creates the contract using the initialized contract template and begins monitoring the operating system for administrative actions related to the events defined in the contract. If one or more processors are to be administratively removed from the processor set, the contract subsystem generates a CPUremove event that includes the number of processors to be removed. If removal of the number of processors specified in the event will reduce the number of processors in the processor set below that specified in the MinCPUs term, the contract subsystem marks this event as a negotiation event before placing the event in the event queue of the contract.

If one or more processors are to be administratively added to the processor set, the contract subsystem generates a CPUadd event that includes the number of processors to be added. If the addition of the number of processors specified in the event will increase the number of processors in the processor set above that specified in the MaxCPUs term, the contract subsystem marks this event as a negotiation event before placing the event in the event queue. Thus, the process will be notified to scale back on processor usage when the number of processors in the processor set is about to drop below four or to increase processor usage when the number of processors in the processor set increases above five.

For example, assume the system administrator removes two processors from the processor set, lowering the number of processors to three. Before the removal is accomplished, the contract subsystem receives information from the operating system that the processor will be removed. The contract subsystem generates a CPUremove event and marks the event as a negotiation event indicating that the operating system is negotiating a departure from the contract, i.e., breaking the terms of the contract. The contract subsystem then places the event in the event queue of the contract. The process retrieves this negotiation event from the event queue and a predetermined negotiation period begins. The removal of the two processors is blocked during this negotiation period.

First, the process modifies its process contract template to define new terms for a new contract with the modified processor set. The process sets the MinCPUs term to be two and the MaxCPUs term to be three. The process then informs the contract subsystem that a new contract using the modified contract template is to be created when the operating system removes the two processors from the processor set. The process then scales back its processing to use only two processors.

During this negotiation period, the process is given a predetermined time quantum that is shorter than the full negotiation period to complete any necessary response to the change in processor number. The process may periodically send requests for additional time quanta if the time required to set up the new contract and scale back on processing exceeds the initial time quantum. However, the total amount of time for the response cannot exceed the allocated negotiation period. If a time quantum expires without a request from the process for additional time, the negotiation period is ended. When the process has completed its response, the process acknowledges the negotiation event to indicate that the operating system can proceed with removing the processors.

The operating system removes the processors from the processor set, and the requested new contract is created. An event indicating that the new contract has been created is sent to the old contract. The process receives this event and terminates the old contract.

In one embodiment, the contract interface (122 in FIG. 1) is implemented, at least in part, as a pseudo file system. A pseudo file system provides file-like abstractions and file I/O (i.e., input/output) interfaces to system functionality that is not a file in the traditional sense. For example, the /proc pseudo file system in UNIX operating systems represents the address space of a process as a series of files.

Figure 2:
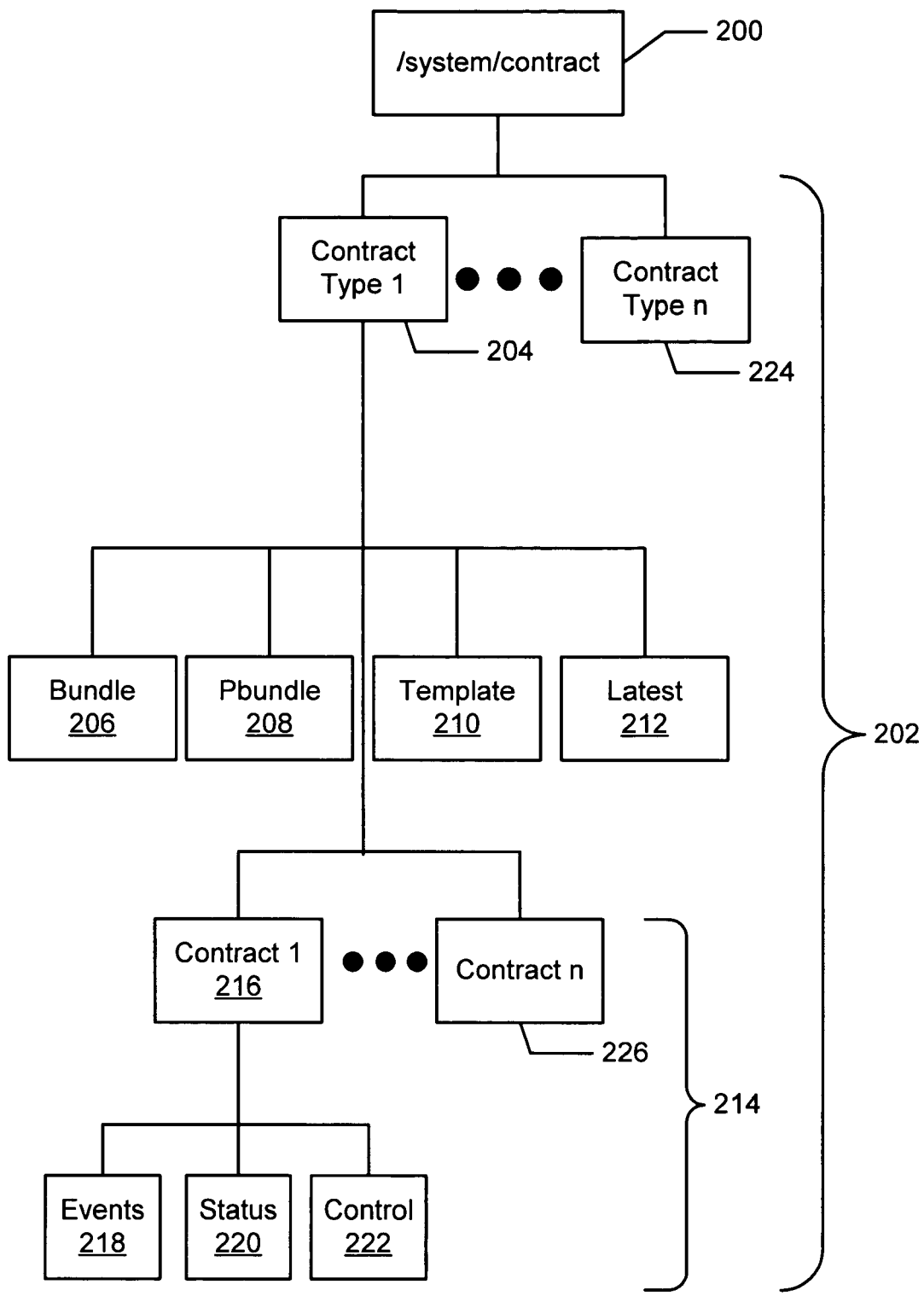
FIG. 2 shows a pseudo file system interface for the contract subsystem in accordance with one embodiment of the invention.

FIG. 2 shows the file hierarchy of a pseudo file system interface for the contract subsystem (100 in FIG. 1) in accordance with one embodiment of the invention. The objects in the contract subsystem (100 in FIG. 1) are treated as files. A combination of standard file system commands (e.g., open, close, etc.) and contract specific commands are provided to access the files in the contract file hierarchy.

The top-level directory (200) of the contract pseudo file system includes subdirectories (202) for each contract type that may be created (e.g., Contract Type 1 (204), Contract Type n (224)) in accordance with one or more embodiments of the invention. Referring specifically to Contract Type 1 (204), the subdirectories (202) include four files: the bundle file (206), the process bundle file (208), the template file (210), and the latest file (212). Opening the template file (210) returns a file descriptor for a new contract template of the type represented by the subdirectory Contract Type 1 (204). Opening the bundle file (206) returns a file descriptor for a bundle event queue which receives events from all contracts on the system of the type represented by the subdirectory Contract Type 1 (204). Opening the process bundle file (208) returns a file descriptor for a process bundle queue which receives events from all contracts held by the opening process that are of the type represented by the subdirectory Contract Type 1 (204). Opening the latest file (212) returns a file descriptor for the status file of the last contract of the type represented by the subdirectory Contract Type 1 (204) written by the process executing the open operation.

As shown in FIG. 2, in one embodiment, Contract Type 1 (204) also includes a variable number of subdirectories (214) corresponding to existing contracts of the type represented by Contract Type 1 (204) (e.g., Contract 1 (216), Contract n (226)). Referring specifically to Contract 1 (216), these subdirectories (214) include three files: the events file (218), the status file (220), and the control file (222). Opening the events file (218) returns a file descriptor for accessing contract events from the event queue of Contract 1 (216). Opening the status file (220) returns a file descriptor for the status file of Contract 2 (216). In one embodiment, the status file (220) includes the holder of the contract, the terms of the contract, information regarding the number of unacknowledged critical events pending in the event queue, the remaining negotiation time if a negotiation is underway, the time remaining before the current negotiation quantum runs out, etc.

Opening the control file (222) returns a file descriptor for the control file of Contract 1 (216). In one embodiment, the control file (222) operates as a control point for a process (104 in FIG. 1) to direct the contract subsystem (100 in FIG. 1) to perform control operations on the contract represented by Contract 1 (216). These control operations include adopting the contract, abandoning the contract (i.e., terminating the contract), acknowledging a critical event, acknowledging a negotiation event to allow the system to proceed with the action triggering the negotiation event, requesting a new time quantum for a negotiation, and instructing the contract subsystem (100 in FIG. 1) that when the current exit negotiation completes, another contract is to be established.

Figure 3:
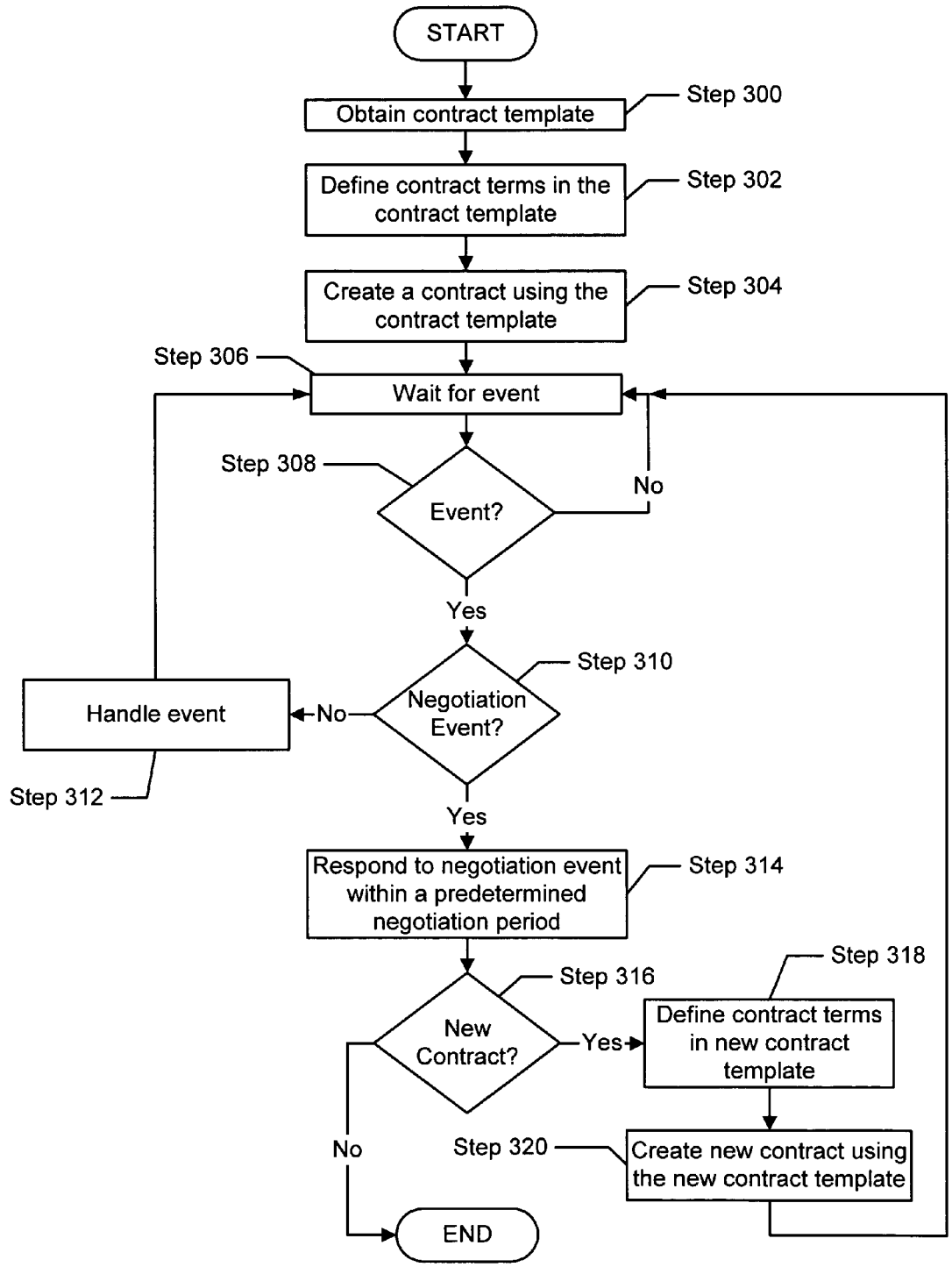
FIGS. 3 and 4 show flowcharts in accordance with one or more embodiments of the invention.

FIG. 3 shows a method for negotiating an exit from a binding relationship between a system resource and a process in accordance with one embodiment of the invention. A contract template for the type of the system resource with which a process has or plans to establish a binding relationship is obtained (Step 300). The terms of the contract are defined by setting the terms in the contract template to indicate when events related to the terms are negotiation events (e.g., MinCPUs is set to 2 to indicate that a CPUremove event reducing the number of CPUs to 1 is a negotiation event) (Step 302). In one embodiment, events provided in the contract template may be designated as informational or critical if such designation is permitted in the type of contract to be created (Step 302). A binding relationship between the process and the system resource is then created if the binding relationship does not already exist. A contract between the process and the system resource is then created around the binding relationship using the initialized contract template (Step 304).

Once the contract is created, monitoring for the events identified in the contract begins (Steps 306 and 308). In one embodiment, the events are maintained in an event queue associated with the contract and in a process bundle queue. The process owning the contract may access the events from either queue.

If an event identified in the contract occurs (Step 308), then a determination is made as to whether the event violates a term of the contract, i.e., is a negotiation event (Step 310). If the event is not a negotiation event, then the event is handled, at least in part, by acknowledging the event (Step 312). Monitoring for additional events then resumes (Steps 306 and 308).

In one embodiment, acknowledging non-negotiation events makes these events eligible to be removed from an event queue associated with the contract. Other actions may also be taken in handling non-negotiation events according to some process internal criteria that is beyond the scope of the invention. All events that are designated as critical are held in the event queue until acknowledged by the process holding the contract, while some informational events may be discarded in FIFO order from the event queue if process does not acknowledge the informational events in a timely fashion.

Still referring to FIG. 3, if the event is a negotiation event (Step 310), then a predetermined amount of time, i.e., a negotiation period, is given to the process to respond to the negotiation event (Step 314). Typically, the response is to adjust the process's usage of the system resource as required based on the type of the event. The system action represented by the event is blocked until the process completes any necessary adjustments or until the negotiation period ends, whichever occurs first. In one embodiment, the process signals completion of any necessary adjustment by acknowledging the negotiation event.

In one embodiment, during the negotiation period, the process must periodically signal that the response is still underway. The length of time between these periodic signals is governed by a quantum timeout included in the contract. In one embodiment, the length of the quantum timeout is predetermined based on the type of the system resource. The process signals that the response is still in progress by requesting a new quantum's worth of time before the current quantum timeout period ends. If the process fails to make such a request before the current timeout quantum ends, the negotiation period is terminated.

Once the process acknowledges the negotiation event, the current contract is terminated. In one embodiment, as shown in Steps 316-320, a new contract is created concurrently with the termination of the current contract if the process requests a new contract. If no new contract is requested, then the current contract is terminated with no further action. If a new contract is requested, then the terms in a contract template are defined as described above in the reference to Step 302 (Step 318). Then, when the current contract is terminated, a new contract is created using this contract template (Step 320). Subsequently, the process waits for another event to occur (Step 306).

Figure 4:
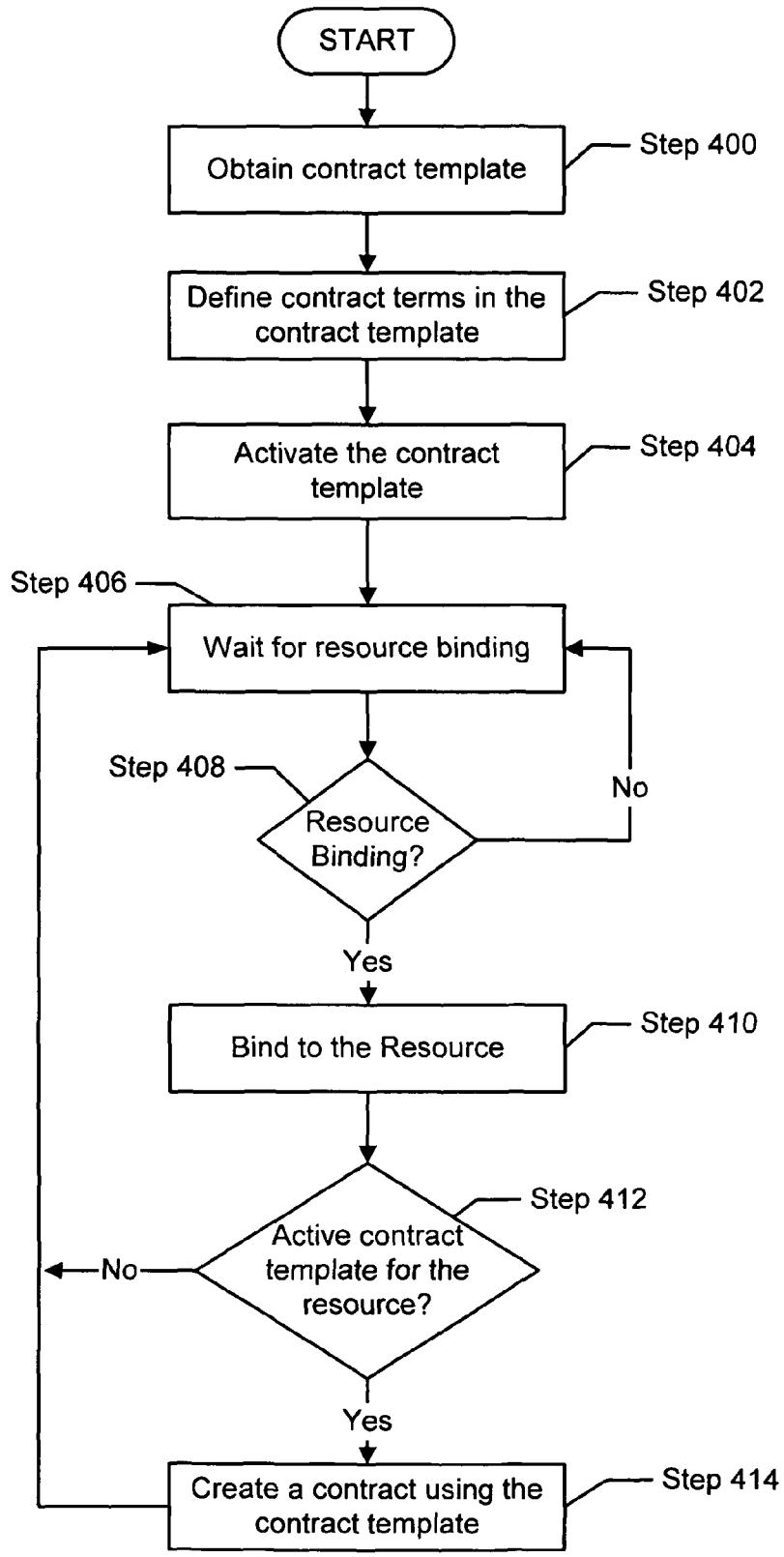

FIG. 4 shows a method for negotiating an exit from a binding relationship between a system resource and a process in accordance with one embodiment of the invention. A contract template for the type of system resource with which the process plans to establish a binding relationship is obtained (Step 400). The terms in the contract template are defined to designate the operating assumptions of the process as the process executes using the type of system resource associated with the contract template (Step 402). In one embodiment, events provided in the contract template are designated as critical or informational if such designation is permitted in the type of contract to be created.

The initialized contract template is then activated (Step 404). Activation places the initialized contract template in a state of readiness so that a contract using the initialized contract template can be created any time the process establishes a binding relationship with the type of system resource associated with the contract template. Each time a binding relationship between the process and a system resource is established (as described in Steps 406-410), a determination is made as to whether an activated contract template exists for the type of system resource involved in the binding relationship (Step 412). If an activated contract template exists, a contract is created around the binding relationship using that contract template (Step 414). Subsequently, the system waits for another resource binding to occur (Step 406). The contracts created using the activated contract template may then be used for exit negotiation and other event handling as described in relation to Steps 306-320 of FIG. 3.

One or more embodiments of the invention provide a means for efficiently modifying a binding relationship between a system resource and a process when an administrative change is made in the availability of the system resource. Specifically, embodiments of the invention provide mechanisms and methods to establish a contract between a process and a system resource, the terms of which express the availability assumptions of the process with regard to the system resource. If an administrative change is to be made that violates one of the terms of a contract, a process holding the contract is notified of the change and provided an opportunity to adjust the process's usage of the affected system resource before the change takes place. While a process is provided a time period to react to the administrative change, the process is not allowed to indefinitely block the change.

Figure 5:
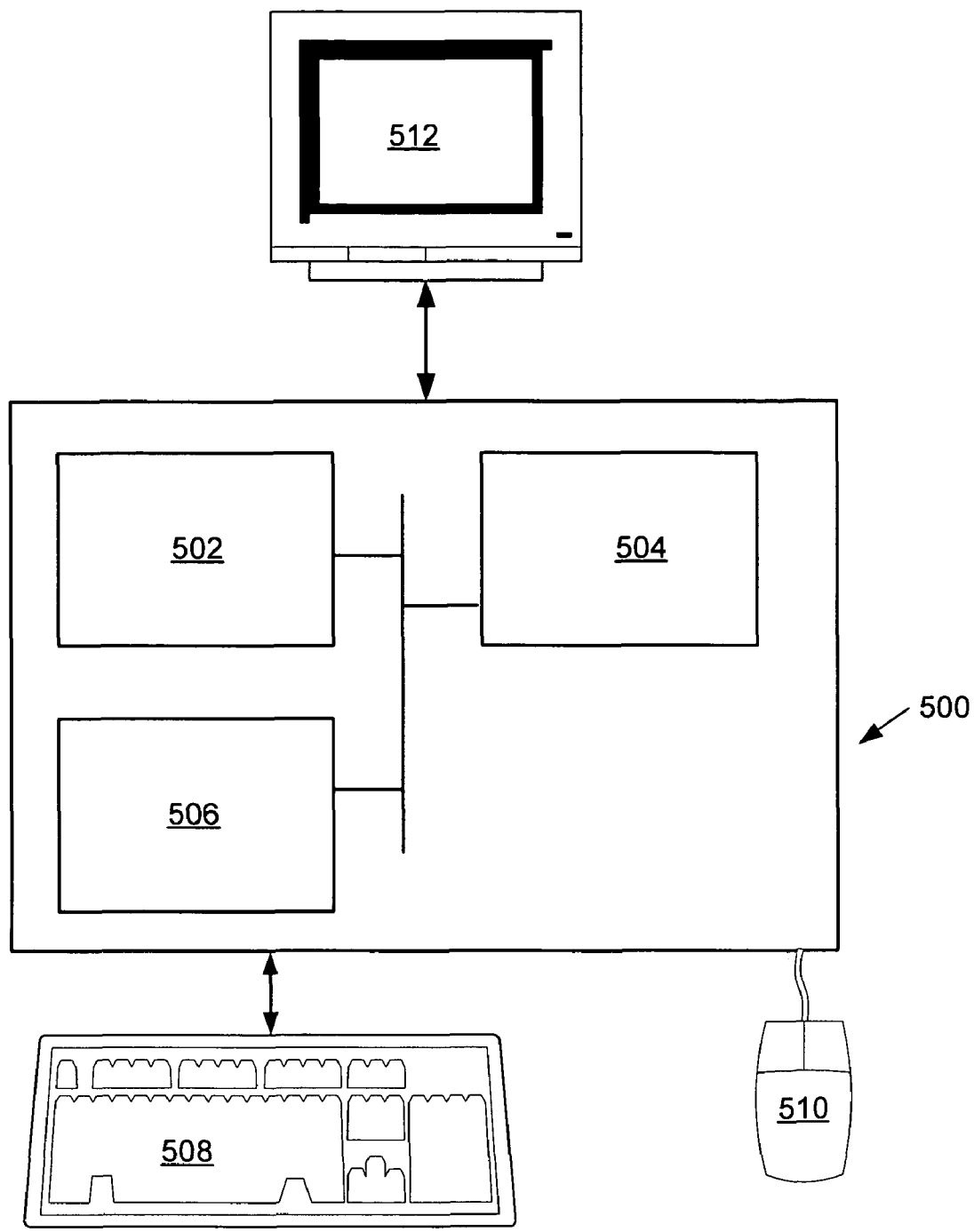
FIG. 5 shows a computer system in accordance with one embodiment of the invention.

An embodiment of the invention may be implemented on virtually any type of computer regardless of the platform being used. For example, as shown in FIG. 5, a computer system (500) includes a processor (502), associated memory (504), a storage device (506), and numerous other elements typical of today's computers (not shown). The computer system (500) may also include additional processors (not shown). The computer (500) may also include input means, such as a keyboard (508) and a mouse (510), and output means, such as a monitor (512). The computer system (500) is connected to a local area network (LAN) or a wide area network via a network interface connection (not shown). Those skilled in the art will appreciate that these input and output means may take other forms. Further, those skilled in the art will appreciate that one or more elements of the aforementioned computer (500) may be located at a remote location and connected to the other elements via a network.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A computer usable storage medium having computer readable program code embodied therein, the computer readable program code adapted to, when executed by a processor, implement a method, the method comprising:
    creating a binding relationship between a process and a system resource;
    establishing a contract specifying the binding relationship between the process and the system resource, wherein the contract is a stored data object specifying at least a negotiation event, wherein the negotiation event is based on an availability level of the system resource for the process, and wherein the contract is created using a contract template associated with a type of the system resource;
    receiving an event affecting an availability of the system resource, wherein the event is received from a bundle queue, and wherein the bundle queue aggregates contract events from all contracts created with the same contract type;
    determining whether the event matches the negotiation event specified in the contract; and
    negotiating an exit from the binding relationship within a duration of a negotiation period when the event matches the negotiation event,
        wherein the negotiation period is predetermined based on the system resource, and
        wherein negotiating the exit comprises one selected from a group consisting of adjusting a use of the system resource by the process and terminating the contract.

2. The computer usable storage medium of claim 1, further comprising, upon terminating the contract, creating a new contract between the process and the system resource.

3. The computer usable storage medium of claim 1, wherein establishing the contract comprises:
    obtaining the contract template associated with the type of the system resource, wherein the contract template comprises a term and an event related to the term;
    defining the term to designate when the event is a negotiation event; and
    creating the contract using the contract template.

4. The computer usable storage medium of claim 1, wherein establishing the contract comprises:
    obtaining the contract template associated with the type of the system resource, wherein the contract template comprises a term and an event related to the term;
    defining the term to designate when the event is a negotiation event; and
    activating the contract template,
    wherein the contract is created using the activated contract template when the binding relationship is created.

5. The computer usable storage medium of claim 1, further comprising:
    abandoning the contract, wherein the contract is placed in a dead state or an orphaned state; and
    terminating the contract if the contract is in the dead state.

6. The computer usable storage medium of claim 5, further comprising:
    transitioning the contract from the orphaned state to the dead state if the contract is in the orphaned state.

7. The computer usable storage medium of claim 1, further comprising:
    obtaining contract events in the process; and
    handling the contract events.

8. The computer usable storage medium of claim 7, wherein the contract events are obtained from a process bundle queue, and wherein the process bundle queue aggregates contract events from all contracts held by the process.

9. The computer usable storage medium of claim 7, wherein the contract comprises a contract event queue and the contract events are obtained from the contract event queue.

10. The computer usable storage medium of claim 1, wherein the system resource is a processor set.

11. The computer usable storage medium of claim 10, wherein the negotiation event is one selected from a group consisting of removing a processor from the processor set and adding a processor to the processor set.

12. A computer usable storage medium having computer readable program code embodied therein, the computer readable program code adapted to, when executed by a processor, implement a method, the method comprising:
for each process of a plurality of processes:
creating a binding relationship between the process and a system resource;
establishing a contract specifying the binding relationship,
wherein the contract is a stored data object specifying at least a negotiation event,
wherein the negotiation event is based on an availability level of the system resource for the process,
wherein the contract is created using a contract template associated with a type of the system resource;
receiving an event affecting an availability of the system resource,
wherein the event is received from a bundle queue,
wherein the bundle queue aggregates contract events from all contracts created with the same contract type;
determining whether the event matches the negotiation event specified in the contract; and
negotiating an exit from the binding relationship within a duration of a negotiation period when the event matches the negotiation event,
wherein the negotiation period is predetermined based on the system resource, and
wherein negotiating the exit comprises one selected from a group consisting of adjusting a use of the system resource by the process and terminating the contract.

13. A system for changing a binding relationship with a system resource comprising:
a processor;
a process configured to execute on the processor;
the system resource, wherein the process has the binding relationship with the system resource;
a contract specifying the binding relationship between the process and the system resource, wherein the contract is a stored data object specifying at least a negotiation event, wherein the negotiation event is based on an availability level of the system resource for the process, and wherein the contract is created using a contract template associated with a type of the system resource; and
a contract subsystem providing management of the contract,
wherein the contract subsystem is configured to:
receive an event affecting an availability of the system resource, wherein the event is received from a bundle queue, and wherein the bundle queue aggregates contract events from all contracts created with the same contract type;
determine whether the event matches the negotiation event specified in the contract; and
provide the process a negotiation period if the event matches the negotiation event,
wherein the negotiation period is predetermined based on the system resource,
wherein the process negotiates an exit from the binding relationship within a duration of the negotiation period, and
wherein negotiating the exit comprises one selected from a group consisting of adjusting a use of the system resource by the process and terminating the contract.

14. The system of claim 13, further comprising a contract interface between the process and the contract subsystem, wherein the process interacts with the contract subsystem to direct the contract subsystem to create the contract.

15. The system of claim 14, wherein the contract interface comprises a file system interface.

16. The system of claim 14, wherein the contract subsystem comprises a process bundle queue, wherein the process interacts with the contract interface to obtain a contract event from the process bundle queue, and wherein the process bundle queue aggregates contract events from all contracts held by the process.

17. A computer system enabled to change a binding relationship with a system resource, comprising:
a processor;
a memory operatively connected to the processor;
the system resource; and
software instructions stored in the memory for enabling the computer system to:
create the binding relationship between a process and the system resource;
establish a contract specifying the binding relationship between the process and the system resource, wherein the contract is a stored data object specifying at least a negotiation event, wherein the negotiation event is based on an availability level of the system resource for the process, and wherein the contract is created using a contract template associated with a type of the system resource;
receive an event affecting an availability of the system resource,
wherein the event is obtained from a bundle queue,
wherein the bundle queue aggregates contract events from all contracts created with the same contract type;
determine whether the event matches the negotiation event specified in the contract; and
negotiate an exit from the binding relationship within a duration of a negotiation period when the event matches the negotiation event,
wherein the negotiation period is predetermined based on the system resource, and
wherein negotiating the exit comprises one selected from a group consisting of adjusting a use of the system resource by the process and terminating the contract.

18. The computer system of claim 17, wherein the software instructions for negotiating the exit further comprise, upon terminating the contract, creating a new contract between the process and the system resource.

19. The computer system of claim 17, wherein the software instructions for establishing the contract enable the computer system to:
obtain the contract template associated with the type of the system resource, wherein the contract template comprises a term and an event related to the term;
define the term to designate when the event is a negotiation event; and
create the contract using the contract template.

20. The computer system of claim 17, wherein the software instructions for establishing the contract enable the computer system to:
obtain the contract template associated with the type of the system resource, wherein the contract template comprises a term and an event related to the term;
define the term to designate when the event is a negotiation event; and activate the contract template, wherein the contract is created using the activated contract template when the binding relationship is created.

21. The computer system of claim 17, further comprising software instructions for enabling the computer system to:
abandon the contract, wherein the contract is placed in a dead state or an orphaned state; and
terminate the contract if the contract is in the dead state.

22. The computer system of claim 21, further comprising software instructions for enabling the computer system to:
transition the contract from the orphaned state to the dead state if the contract is in the orphaned state.

23. The computer system of claim 17, further comprising software instructions for enabling the computer system to:
obtain contract events in the process; and
handle the contract events.

24. The computer system of claim 23, wherein the contract events are obtained from a process bundle queue, and wherein the process bundle queue aggregates contract events from all contracts held by the process.

25. The computer system of claim 23, wherein the contract comprises a contract event queue and the contract events are obtained from the contract event queue.

26. The computer system of claim 23, further comprising software instructions for enabling the computer system to:
permit access to the contract events by an administrative user.

27. The computer system of claim 17, wherein the system resource is one selected from the group consisting of a countable resource, a fungible countable resource, a rate-based resource, a continuous amount resource, and a relationship resource.

28. The computer system of claim 17, wherein the system resource is a processor set.

29. The computer system of claim 28, wherein the negotiation event is one selected from the group consisting of removing a processor from the processor set and adding a processor to the processor set.

30. The computer usable storage medium of claim 1, wherein the contract further specifies a quantum timeout shorter than the negotiation period, and wherein the duration of the negotiation period is ended if the quantum timeout is reached without a notification of negotiating the exit from the binding relationship.

31. The computer usable storage medium of claim 1, wherein establishing a contract is performed by a contract subsystem, wherein the contract subsystem comprises a file system interface.

32. The computer usable storage medium of claim 31, wherein, within the file system interface, the contract comprises an events file, a status file, and a control file.

33. The system of claim 15, wherein, within the file system interface, the contract comprises an events file, a status file, and a control file.

* * * * *